Patented Apr. 29, 1952

2,594,280

UNITED STATES PATENT OFFICE 2,594,280

CEMENT BONDED NATURAL CELLULOSE AGGREGATE IMPREGNATED WITH CURED SYNTHETIC RESIN AND METHOD OF MAKING THE SAME

Julian F. Beaudet, Lake George, N. Y.

No Drawing. Application March 11, 1949,
Serial No. 81,030

6 Claims. (Cl. 260—17.2)

The present invention relates to a composition of matter and method of making it, and the primary object is to provide a new and improved composition of matter which may be produced inexpensively, and which possesses maximum strength and durability with minimum weight, and which is adapted for use for a variety of purposes.

A more particular object of the invention is to provide a novel and improved composition of matter and method of making it which comprises cement-bonded light weight aggregate which may be obtained largely as organic waste material, and more especially cellulosic or vegetable fibrous materials, and which is fire resistant, sound-absorbent and heat insulating, and is suitable for building construction and other purposes as a substitute for wood, stone and the like.

Attempts have heretofore been made to combine organic waste materials as aggregate with inorganic cementitious materials as, for example, by combining such wastes with special cement mixtures, but such attempts have not been satisfactory because the organic materials as used absorbed water vapors, causing the organic materials to swell and thereby create stresses within the mixture comprising the product.

Efforts have been made to avoid such swelling of the organic aggregate by treating the product with resin after the product has been formed, but such efforts in most cases have failed because it was found impossible to obtain effective penetration of the resin into the aggregate or to obtain effective penetration of the heat necessary for curing such resin as might penetrate the aggregate.

Other efforts to use untreated organic wastes and cementitious materials seem to have failed for all of the foregoing reasons, and for the further reason that waste materials exude chemical substances which inhibit or retard the proper setting of the cement.

The present invention provides a novel and improved composition and method of making the same whereby the foregoing objections and difficulties are avoided. According to the present invention, the organic waste or other cellulosic or fibrous material to be used as the aggregate is stabilized by treating small pieces of such material with a synthetic resin of low molecular weight which penetrates easily to the centers of the small pieces of the aggregate, and which provides for easy penetration of heat to effect cure of the resin impregnating the pieces of aggregate, and facilitates release of the resin solvent. The resin impregnating the pieces of aggregate fills or seals the cells or pores thereof, thereby stabilizing them and minimizing swelling or other dimensional change due to absorption of water in the cement mixture. The aggregate, due to the small sizes thereof, may be handled easily, thereby facilitating the manufacture of the product. The treated aggregate, after mixing with a cementitious binder and curing, possesses all of the properties necessary for permanent strength and durability.

The organic waste used as aggregate may consist of sawdust, wood shavings, bagasse, wood pulp, wood chips, small chopped sticks of wood and trash, grasses and weeds, or other organic or vegetable fibrous material.

The resin used for stabilizing the pieces of aggregate may be a thermo-setting condensation product such as a phenol-formaldehyde resin or a homologue thereof, a urea formaldehyde resin or its homologue, a melamine resin, a vinyl type resin such as styrene or vinyl acetate, a resin of the furane group such as a furfuraldehyde resin or a furfural alcohol resin, a lignin resin such as the various resins made from waste products of paper mills, or any other resin which can be cured within the cell structure of organic wastes or similar materials.

The cementitious material used as a binder for the aggregate may be a hydraulic cement such as a Portland cement of high early strength, or of the regular or special types, a magnesium oxychloride cement, a gypsum cement such as plaster of Paris or a chemically similar material known as Hydrocal, or any other organic mineral type of a cementitious nature.

The following are examples of preferred methods of making the improved composition.

*Example 1*

Sawdust which may or may not be dry, is soaked in a water-soluble low molecular weight phenol-formaldehyde resin overnight of for a period of about 24 hours, either with a catalyst such as 0.5% of hydrochloric acid, sodium hydroxide or borax, or without a catalyst, the sawdust absorbing about 30% of its dry weight of the resin. The sawdust thus treated is cured by heating it to a temperature of 100° F. for 24 hours, after which the temperature is raised to 300° F. and maintained at that temperature for 10 minutes, thereby curing the resin impregnating the particles of sawdust and releasing the resin solvent therefrom and fixing the acids and other soluble substances in the particles of sawdust. The sawdust thus impregnated with the resin and stabilized is then mixed with Portland cement preferably in the proportion of 3 parts of sawdust to 1 part of cement by dry weight, to which mixture is added water in an amount sufficient to give the mixture the desired consistency for pouring, shaping or working. The resulting mixture can be cast, molded, poured or otherwise shaped into the desired form in the same manner as the usual products containing stone, sand and the like as aggregate. The product is then cured for about 1 month in a moist atmosphere.

The resulting final product is light in weight, fire-resistant and sound-absorbent, and possesses heat insulating properties and strength, and can be sawed, nailed, planed, polished, cut, painted and otherwise worked or treated like wood, and may be used for building blocks, panels, slabs, machine sections, novelties and for a variety of other purposes, the product having physical properties intermediately between stone and wood.

Example 2

Bagasse, ground to a coarse pulp, is soaked for 24 hours in a solution made from 6 parts of dimethyl olurea and 2 parts of urea by weight and dissolved in 22 parts of water, the bagasse is then removed from the solution and air-dried, then heated at a temperature of 250° F. for 15 minutes, thus rendering the bagasse suitable for mixing with the cementitious binder. If a 1 to 1 mixture of treated bagasse and caustic calcined magnesite are mixed dry and then wetted with a gauging solution of 90% magnesium chloride and 10% magnesium sulphate adjusted to 24° Baumé with water at 70° F., the resulting composition will set at room temperature in about 5 or 6 hours and increase in strength for 28 days, giving a product which is dense and strong, light in weight, and fire-resistant, and is suitable for flooring and as a similar material.

Example 3

Wood chips, about ½ inch by ½ inch, are placed in a closed container with 20% by weight of styrene monomer in which 2% of benzol peroxide is dissolved. This mixture when allowed to stand at 120° F. for one week, will have polymerized the styrene within the wood structure, sealing, stabilizing and strengthening the wood. The wood so treated is then mixed with equal parts by weight of plaster of Paris and water to give the mixture appropriate consistency for working, and the resulting product can be pressed into a light-weight block of material suitable for insulating purposes.

Example 4

Equal molecular weights of furfural and resorcin are formed into a solution by stirring, and this solution is poured over chopped grass or straw in a container in an amount of the solution equal to 30% of the dry weight of the grass or straw, the solution impregnating the particles of grass or straw upon standing for one day with some mechanical stirring. An acid, such as hydrochloric acid, in gaseous form, is then passed through this mixture, forming a resinous substance in situ. Any acid remaining in the mixture is removed by washing the mixture in dilute sodium carbonate. The resulting aggregate may be mixed with Portland cement in the proportion of 2 parts of the aggregate to 1 part of cement, together with sufficient water for easy handling, producing a product which is light in weight and strong.

Example 5

A solution of furfural and lignin in equal parts, to which is added 0.5 part of concentrated hydrochloric acid, is poured over a mixture of dry coarse sawdust and dry ground wood pulp in a container in the proportion of 70% of sawdust and 30% wood pulp, by weight, and the mixture stirred mechanically. In about 4 hours, the mixture of sawdust and wood pulp will be impregnated with the resin forming solution. The impregnated mixture of sawdust and wood pulp is then placed in a jacketed mixer and brought to a temperature of 150° C. for 1 hour. The mixture of sawdust and wood pulp will be found to have turned black, and is suitable for use as an aggregate in admixture with any of the hereinbefore mentioned cements.

Example 6

A water soluble melamine formaldehyde resin is used as an impregnant of sawdust in the manner described in the preceding examples, that is, sawdust is soaked for a sufficient length of time in such solution to pick up about 25% to 30% of the resin, the mixture so treated is removed from the solution and dried for 1 day at 100° F., and then cured for 15 minutes at 300° F. This treatment renders the sawdust suitable for use as an aggregate with inorganic cementitious materials. By using a 3 to 1 mixture of aggregate with high early strength Portland cement and water to give the proper consistency for working, a concrete mixture suitable for making concrete building blocks will result.

By varying the amount of resin absorbed by the aggregate and the ratio of aggregate to cement, products of various strengths and weights may be obtained. For example, chips of wood $\frac{1}{16}$ inch in size may be impregnated with only 10% of resin to the dry weight of the wood, and cured at 300° F. for 15 minutes, and then mixed with plaster of Paris in equal weights, the product being suitable for use as a sound-absorbing panel or as an insulating fill to be used in the interior of walls, or mixed sizes of wastes such as those given in the preceding examples which, when shaken, compact and fill most voids, may be treated with any of the resins hereinbefore mentioned in the ratio of 25% of resin to waste material and mixed with Portland cement in the proportion of 4 parts of the treated wastes to 1 part of Portland cement as a formula for interior building blocks or panels.

By pre-treating the pieces of waste organic or other cellulosic or fibrous organic aggregate with a thermo-setting synthetic resin as hereinbefore described before mixing with the cementitious binder, easy penetration of the resin into the aggregate and release of the resin solvent are achieved, and acids and other soluble substances in the aggregate are fixed, thereby stabilizing the aggregate so that it will not exude substances which would otherwise inhibit setting of the cementitious binder, and filling or sealing the cells or pores of the aggregate and thereby checking swelling or other dimensional change in the aggregate by absorption of water after mixing with the cementitious binder.

I claim:

1. A composition of matter comprising an aggregate composed of small pieces of natural cellulose material impregnated with a cured water soluble synthetic resin, and an enclosing binder comprising a cementitious material selected from the group consisting of a hydraulic cement and plaster of Paris.

2. A composition of matter comprising an aggregate composed of small pieces of natural fibrous cellulose material impregnated with a cured synthetic thermo-setting resin, and an enclosing binder of cementitious material selected from the group consisting of a hydraulic cement and plaster of Paris.

3. A composition of matter comprising an aggregate composed of small pieces of natural cellulose material impregnated with a synthetic resin which is set within the cells of the pieces of aggregate, and a binder of cementitious material selected from the group consisting of a hydraulic cement and plaster of Paris.

4. The method of making a composition of matter, comprising impregnating the cells of an aggregate of natural cellulose material with a synthetic resin, curing the resin impregnating the cells of the aggregate, and mixing the resin-impregnated aggregate with a cementitious binder selected from the group consisting of hydraulic cement and plaster of Paris.

5. The method of making a composition of matter, comprising impregnating the cells of small pieces of cellulosic material with a thermo-setting synthetic resin, heating the resin-impregnated pieces of said material to cure the resin in the cells thereof and fix soluble substances in said pieces, mixing the resin-impregnated pieces with a cementitious material selected from the group consisting of a hydraulic cement and plaster of Paris, and curing the product.

6. The method of making a composition of matter, comprising soaking small pieces of natural cellulose material in a solution of a curable water soluble thermo-setting synthetic resin until the cells of said pieces are substantially filled thereby, curing the resin in and sealing the cells of the material to form an aggregate which is stable dimensionally under the influence of water, and mixing the stabilized aggregate with a binder selected from the group consisting of a hydraulic cement and plaster of Paris.

JULIAN F. BEAUDET.

REFERENCES CITED

The following references are of record in the file of this patent:

UNITED STATES PATENTS

| Number | Name | Date |
|---|---|---|
| 1,996,757 | Elbel | April 9, 1935 |
| 2,192,129 | Ellis | Feb. 27, 1940 |
| 2,240,529 | Tyce | May 6, 1941 |
| 2,255,998 | Howald | Sept. 16, 1941 |
| 2,411,554 | Riccitiello | Nov. 26, 1946 |

FOREIGN PATENTS

| Number | Country | Date |
|---|---|---|
| 562,263 | Great Britain | June 26, 1944 |